US008457419B2

(12) United States Patent
Lamb et al.

(10) Patent No.: US 8,457,419 B2
(45) Date of Patent: Jun. 4, 2013

(54) METHOD OF DECODING ENTROPY-ENCODED DATA

(75) Inventors: Brian Lamb, Waterloo (CA); Michael Carmody, Waterloo (CA); Guixing Wu, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1463 days.

(21) Appl. No.: 11/734,986

(22) Filed: Apr. 13, 2007

(65) Prior Publication Data

US 2008/0253668 A1  Oct. 16, 2008

(51) Int. Cl.
*G06K 9/36* (2006.01)

(52) U.S. Cl.
USPC .......... 382/233; 382/232; 382/167; 382/246; 341/65; 341/64; 341/63; 341/67; 358/1.9; 358/518; 358/523

(58) Field of Classification Search
USPC ................. 382/233, 250, 246, 232, 132, 162, 382/167; 341/65, 64, 63, 67, 50, 60, 87; 707/613, 796, 716, 102, 100; 358/1.9, 518, 358/523; 712/200, 209, 300, 222
See application file for complete search history.

(56) References Cited

U.S. PATENT DOCUMENTS

| | | | | |
|---|---|---|---|---|
| 6,496,882 B2* | 12/2002 | Iverson | | 710/68 |
| 6,650,996 B1* | 11/2003 | Beesley et al. | | 701/537 |
| 6,782,318 B1* | 8/2004 | Beesley et al. | | 701/537 |
| 2002/0130796 A1* | 9/2002 | Tsuchido et al. | | 341/65 |
| 2005/0146450 A1* | 7/2005 | Thomas et al. | | 341/67 |
| 2008/0095434 A1* | 4/2008 | Funayama | | 382/172 |
| 2008/0095453 A1* | 4/2008 | Suzuki et al. | | 382/246 |
| 2008/0122664 A1* | 5/2008 | Chang et al. | | 341/65 |

FOREIGN PATENT DOCUMENTS

EP  1610220 A  12/2005

OTHER PUBLICATIONS

Latendresse et al., , "Generation of Fast Interpreters for Huffman Compressed Bytecode", ACM, published on Jun. 12, 2003, pp. 32-40.*
Sam Kamin, "Program generation consider easy", ACM 2004, p. 68-78, published Aug. 24-25, 2004.*
Latendresse et al., "Generation of Fast Interpreters for Huffman Compressed Bytecode", ACM, published on Jun. 12, 2003, pp. 32-40.*
Kamin, S, "Program Generation Considered Easy". Proceedings of the 2004 ACM Sigplan Symposium on Partial Evaluation and Semantics-Based Program Manipulation (PEPM '04), Aug. 24, 2004, pp. 68-79, Illinois, U.S.A.
Chuang Y-J, et al., "An SGH-Tree Based Efficient Huffman Decoding." Proceedings of the 2003 Joint Conference on Information, Communications and Signal Processing and the Fourth Pacific Rim Conference on Multimedia, vol. 3, Dec. 15, 2003, pp. 1483-1487, Piscataway, New Jersey, U.S.A.

(Continued)

*Primary Examiner* — Mekonen Bekele
(74) *Attorney, Agent, or Firm* — Fish & Richardson P.C.

(57) ABSTRACT

A method of decoding data that is encoded with a set of prefix codes begins by receiving the data at a computing device, and then compiling native machine code from the prefix code set for execution by a processing unit of the computing device. The machine code implements a binary tree of prefix codes that corresponds to the prefix code set. The data is decoded by traversing the prefix code tree, which is effected by executing the machine code with the processing unit.

19 Claims, 10 Drawing Sheets

OTHER PUBLICATIONS

Chang Y-W, et al., "Direct Mapping Architecture for JPEG Huffman Decoder". IEE Proceedings on Communications, vol. 153, No. 3, Jun. 2, 2006, pp. 333-340, Great Britain.

Engler, D.R., "Vcode" A Retargetable, Extensible,Very Fast Dynamic Code Generation System. ACM Sigplan Notices, vol. 31, No. 5, May 21, 1996, pp. 160-170, New York, NY, U.S.A.

Office Action issued in Canadian Application No. 2,628,704 on Feb. 19, 2010; 3 pages.

Office Action issued in Canadian Application No. 2,628,704 on Feb. 1, 2011; 3 pages.

Extended European Search Report issued in European Application No. 07106194.9 on Nov. 2, 2007; 8 pages.

Office Action issued in Canadian Application No. 2,628,704 on Jun. 5, 2012; 2 pages.

\* cited by examiner

METHOD OF DECODING ENTROPY-ENCODED DATA

FIELD OF THE INVENTION

The invention described herein relates to a method of decoding entropy-encoded data. In particular, the invention relates to a computer-based method of decompressing an electronic image that comprises compressed image data and an associated Huffman table.

BACKGROUND OF THE INVENTION

JPEG (Joint Photographic Experts Group) is a commonly-used method for compressing and decompressing photographic images. The method typically involves downsampling the Y, Cb and Cr chroma components of the image, transforming the chroma components to the frequency domain, quantizing and then entropy-coding the result. Typically, the image is entropy-coded by run-length encoding the frequency domain components, and then Huffman-encoding the result. The JPEG standard allows for the use of general-purpose Huffman tables, or custom Huffman tables that have been optimized for the frequency-domain characteristics of the image.

JFIF (JPEG File Interchange Format) is the standardized image format for transmitting JPEG images across the Internet. According to this standard, the file header includes the Huffman table that was used to encode the image. Therefore, to decompress the image at its destination, the recipient device must first extract the Huffman table from the JPEG file, and then decode the image components using the extracted Huffman tree.

This procedure typically requires multiple main memory accesses to the Huffman tree until the image is completely decoded. As a result, decoding a JPEG file can be computationally expensive, resulting in poor performance on MIPS-constrained devices, such as handheld communications devices.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
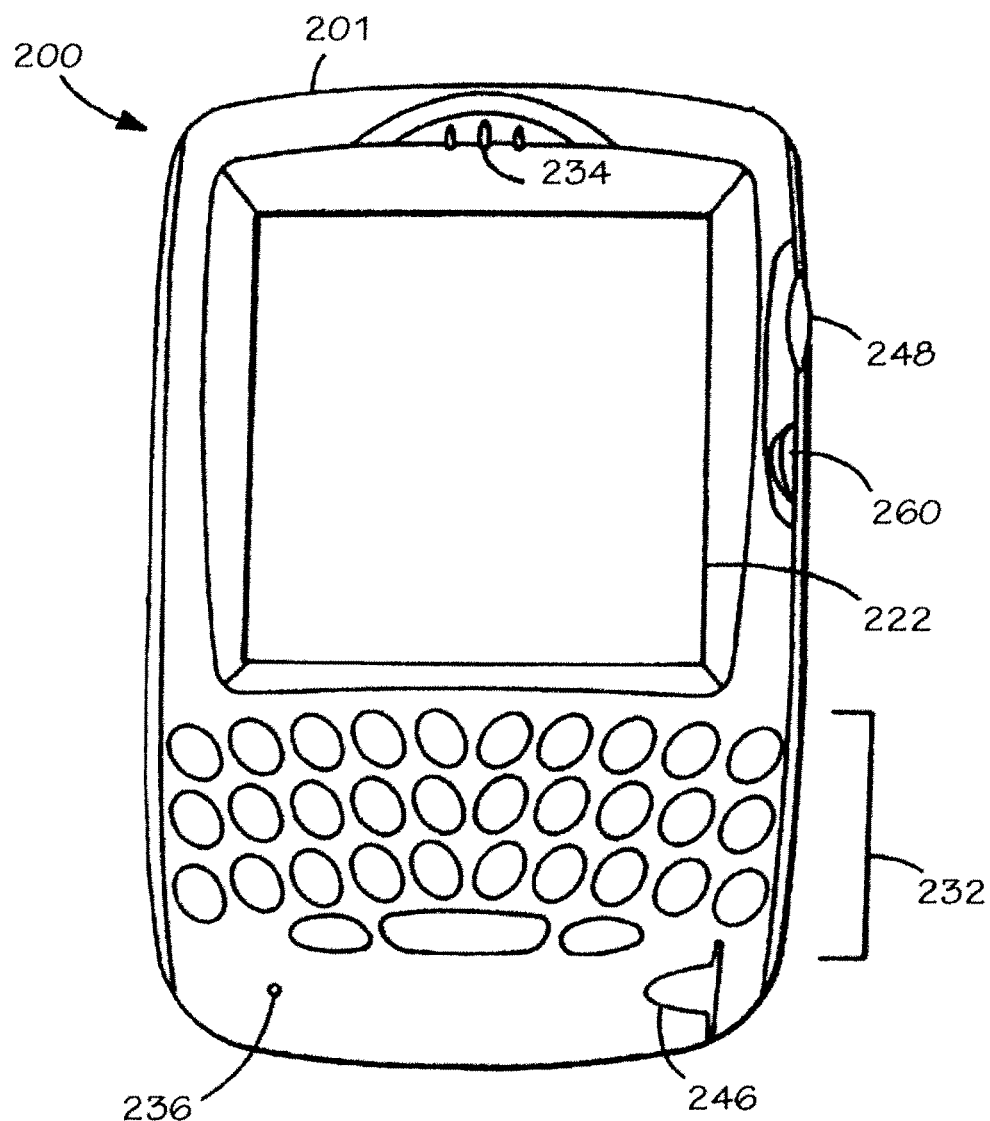
FIG. 1 is a front plan view of a handheld communications device according to the invention.

By way of overview, the invention described herein relates to a handheld communications device that includes a JIT (Just In Time) compiler that is configured to construct a binary tree of prefix codes as native machine code from a set of prefix codes.

As will be described in further detail below, in accordance with a first aspect of the invention there is provided a method of decoding data that is encoded with a set of prefix codes. The method, according to this first aspect of the invention, begins by receiving the data at a computing device, and then compiling native machine code from the prefix code set for execution by a processing unit of the computing device. The machine code implements a binary tree of prefix codes that corresponds to the prefix code set.

The data is decoded by traversing the prefix code tree. The traversing step involves executing the machine code with the processing unit.

In accordance with a second aspect of the invention, there is provided a method of decompressing an electronic image. The electronic image comprises compressed image data, and a set of prefix codes that is associated with the compressed image data.

The method, according to this second aspect of the invention, begins by receiving the compressed electronic image at a handheld computing device, and then compiling native machine code, at the handheld computing device, from the prefix code set for execution by the handheld computing device. The machine code implements a binary tree of prefix codes corresponding to the prefix code set.

The compressed image data is decompressed by traversing the prefix code tree. The traversing step comprises executing the machine code at the handheld computing device.

In accordance with a third aspect of the invention, there is provided a communications device that is configured to decompress an electronic image that comprises compressed image data and an associated set of prefix codes. The prefix code set is associated with the compressed electronic image, and facilitates decoding of the compressed image data.

The communications device comprises a data receiver, and a processing unit that is coupled to the data receiver. The data receiver is configured to receive the compressed electronic image.

The processing unit comprises a compiler that is configured to compile native machine code from the prefix code set. The machine code is configured for execution by the processing unit.

The machine code defines a binary tree of prefix codes that corresponds to the prefix code set. The machine code also implements an image de-compressor that is configured to decompress the compressed image data. The image de-compressor is configured to traverse the prefix code tree by executing the machine code.

In accordance with a fourth aspect of the invention, there is provided a computer readable medium that carries processing instructions for an electronic communications device. The processing instructions, when executed by a computer processor of the communications device, enables the device to decode a data stream that is encoded with a set of prefix codes.

The method of decoding the data stream, according to this fourth aspect of the invention, begins by receiving the data stream at the communications device, and then compiling native machine code from the prefix code set for execution by a processing unit of the communications device. The machine code implements a binary tree of prefix codes that corresponds to the prefix code set.

The data stream is decoded by traversing the prefix code tree. The traversing step involves executing the machine code with the processing unit.

As will be described below, in a preferred implementation the prefix code set comprises a Huffman table, and the prefix code tree comprises a Huffman tree. The handheld computing device comprises a processing unit, and a main memory coupled to the processing unit, and the image de-compressor traverses the Huffman tree by executing the machine code at the processing unit without accessing the main memory. Further, the processing unit traverses the Huffman tree without executing loop opcodes.

Preferably, the processing unit traverses the nodes of the Huffman tree by executing a bit test opcode in association with a processor data register that maintains a portion of the compressed image data. Further, preferably the processing unit traverses one branch off the node by executing a bit shift opcode in response to one outcome of the bit test opcode, and traverses another branch off the node by branching to another bit test opcode in response to another outcome of the bit test opcode. Preferably, the processing unit also executes a return opcode in response to one outcome of the bit test opcode, with the processing unit returning decompressed image data upon execution of the return opcode.

Turning to FIG. 1, there is shown a sample handheld communications device 200 in accordance with the invention. Preferably, the handheld communications device 200 is a two-way wireless communications device having at least voice and data communication capabilities, and is configured to operate within a wireless cellular network. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, a function key 246, and data processing means 202 (see FIG. 2) disposed within a common housing 201. The display 222 comprises a backlit LCD display. The data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or trans-reflective LCD display, and the function key 246 operates as a backlight switch.

In addition to the display 222 and the function key 246, the handheld communications device 200 includes user data input means for inputting data to the data processing means. As shown, preferably the user data input means includes a keyboard 232, a thumbwheel 248 and an escape key 260. The keyboard 232 includes alphabetic and numerical keys, and preferably also includes a "Send" key and an "End" key to respectively initiate and terminate voice communication. However, the data input means is not limited to these forms of data input. For instance, the data input means may include a trackball or other pointing device instead of (or in addition to) the thumbwheel 248.

Figure 2:
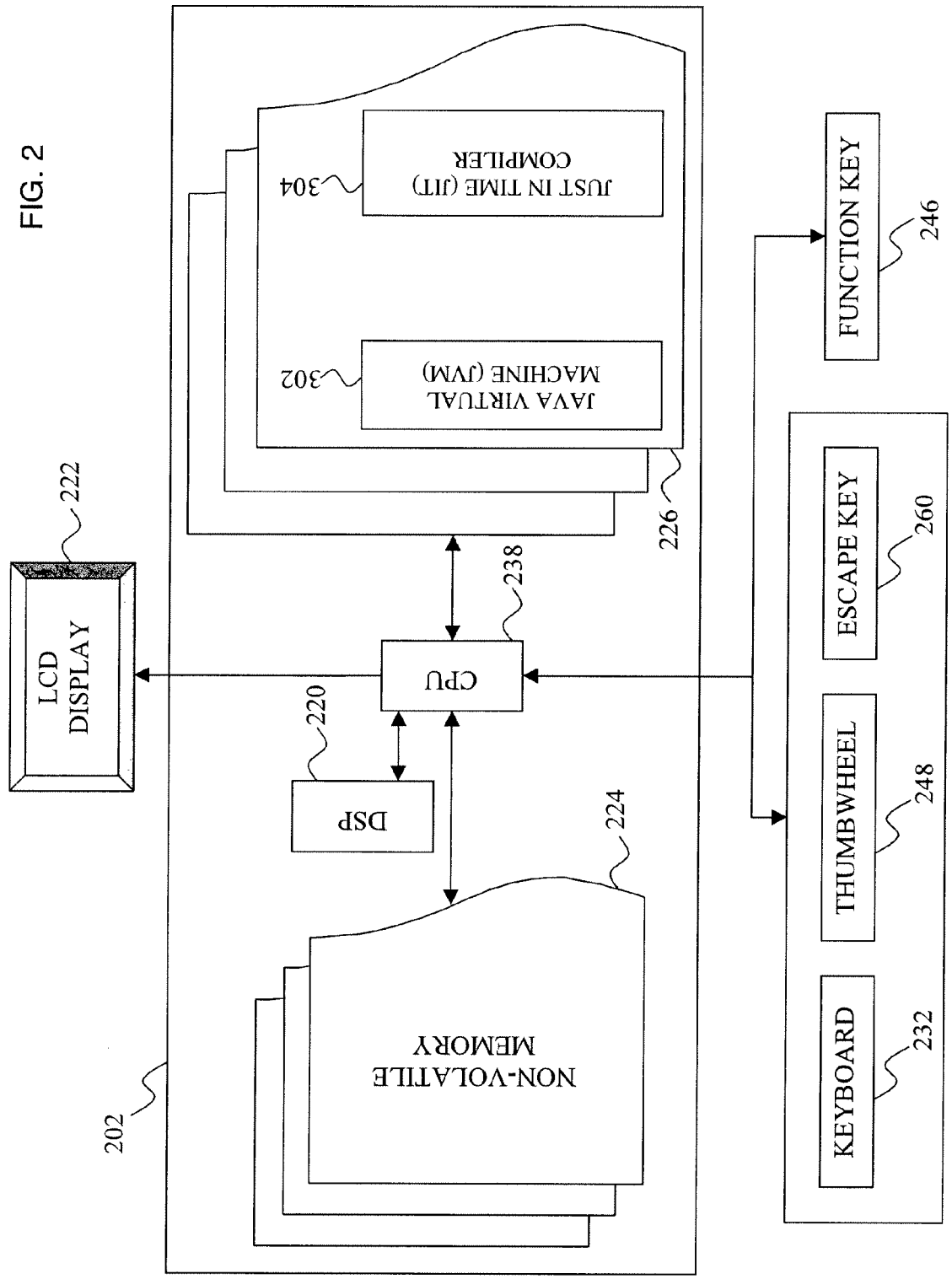
FIG. 2 is a schematic diagram depicting certain functional details of the data processing means of the handheld communications device, including the JIT compiler.

As shown in FIG. 2, the data processing means 202 comprises a microprocessor 238 in communication with flash memory 224 and volatile memory (RAM) 226. The flash memory 224 includes computer processing instructions which, when executed by the microprocessor 238, implement an operating system, computer programs, and operating system specific applications. Alternately, the computer processing instructions may be copied from the flash memory 224 into the RAM 226 upon system reset or power-up, and executed by the microprocessor 238 out of the RAM 226. The operating system comprises an Open Systems Interconnection (OSI) communication protocol stack that allows the handheld communications device 200 to send and receive information over a wireless cellular network and/or a local area wireless network.

The operating system also includes a Java Virtual Machine (JVM) 302, and a Just In Time (JIT) compiler 304. As will be described below, the JIT compiler 304 is configured to compile native machine code from a set of prefix codes that is associated with a data stream that is encoded with the prefix code set. The native machine code defines a binary tree that corresponds to the prefix code set. The data processing means 202 traverses the prefix code tree by executing the native machine code, and without time-consuming main memory lookups and looping operations.

Figure 3:
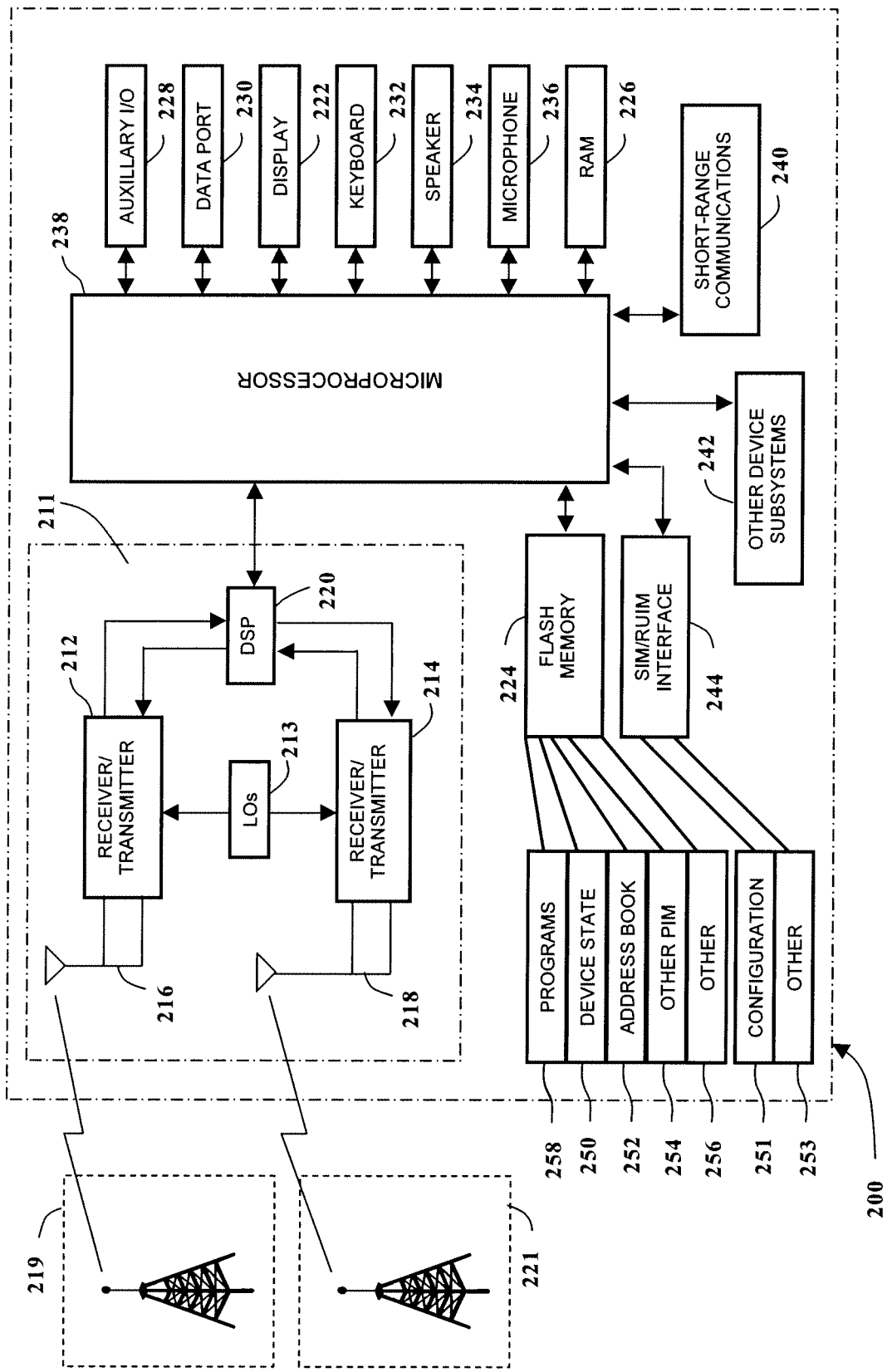
FIG. 3 is a schematic diagram depicting certain additional functional details of the handheld communications device.

FIG. 3 depicts functional details of the handheld communications device 200. As shown, the handheld communications device 200 incorporates a motherboard that includes a communication subsystem 211, and a microprocessor 238. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

Typically, the communication subsystem 211 sends and receives wireless communication signals over a wireless cellular network via the primary transmitter/receiver 212 and the primary internal antenna 216. Further, typically the communication subsystem 211 sends and receives wireless communication signals over a local area wireless network via the secondary transmitter/receiver 214 and the secondary internal antenna 218.

Preferably, the primary internal antenna 216 is configured for use within a Global System for Mobile Communications (GSM) cellular network or a Code Division Multiple Access (CDMA) cellular network. Further, preferably the secondary internal antenna 218 is configured for use within a WLAN WiFi (IEEE 802.11x) or Bluetooth network. Although the handheld communications device 200 is depicted in FIG. 2 with two antennas, it should be understood that the handheld communications device 200 may instead comprise only a single antenna, with a dual-band antenna being connected to both the primary transmitter/receiver 212 and the secondary transmitter/receiver 214.

Signals received by the primary internal antenna 216 from the wireless cellular network are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network are processed by the DSP 220 and input to transmitter section of the primary transmitter/receiver 212 for digital to analog conversion, frequency up conversion, and transmission over the wireless cellular network via the primary internal antenna 216.

Similarly, signals received by the secondary internal antenna 218 from the local area wireless network are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the local area wireless network are processed by the DSP 220 and input to transmitter section of the secondary transmitter/receiver 214 for digital to analog conversion, frequency up conversion, and transmission over the local area wireless network via the secondary internal antenna 218.

The communications device 200 also includes a SIM interface 244 if the handheld communications device 200 is configured for use within a GSM network, and/or a RUIM interface 244 if the handheld communications device 200 is configured for use within a CDMA network. The SIM/RUIM interface 244 is similar to a card-slot into which a SIM/RUIM card can be inserted and ejected like a diskette or PCMCIA card. The SIM/RUIM card holds many key configurations 251, and other information 253 including subscriber identification information, such as the International Mobile Subscriber Identity (IMSI) that is associated with the handheld communications device 200, and subscriber-related information.

The microprocessor 238, in conjunction with the flash memory 224 and the RAM 226, comprises the aforementioned data processing means 202 and controls the overall operation of the device. The data processing means 202 interacts with device subsystems such as the display 222, flash memory 224, RAM 226, auxiliary input/output (I/O) subsystems 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

As shown, the flash memory 224 includes both computer program storage 258 and program data storage 250, 252, 254 and 256. Computer processing instructions are preferably also stored in the flash memory 224 or other similar non-volatile storage. Other computer processing instructions may also be loaded into a volatile memory such as RAM 226. The computer processing instructions, when accessed from the memory 224, 226 and executed by the microprocessor 238 define the operating system, computer programs, and operating system specific applications. The computer processing instructions may be installed onto the handheld communications device 200 upon manufacture, or may be loaded through the cellular wireless network, the auxiliary I/O subsystem 228, the data port 230, the short-range communications subsystem 240, or the device subsystem 242. In addition to the functions previously described herein, the operating system allows the handheld communications device 200 to operate the display 222, the auxiliary input/output (I/O) subsystems 228, data port 230, keyboard 232, speaker 234, microphone 236, short-range communications subsystem 240, and device subsystems 242.

Typically, the computer programs include communication software that configures the handheld communications device 200 to receive one or more communication services. For instance, preferably the communication software includes internet browser software, e-mail software, telephone software and GPS-mapping software that respectively allow the handheld communications device 200 to communicate with various computer servers over the internet, send and receive e-mail, initiate and receive telephone calls, and view electronic maps. In addition, the computer programs may include still image viewing software that allows the user to view electronic images that are saved in the flash memory 224 or the RAM 226.

In data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless cellular network or the local area wireless network through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 4:
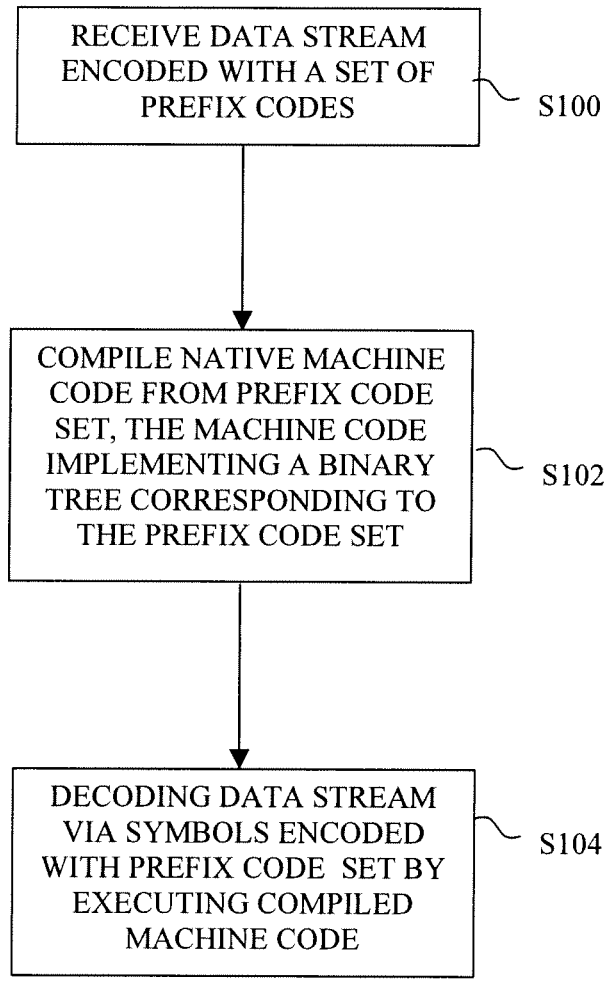
FIG. 4 is a flow chart depicting, by way of overview, the method performed by the handheld communications device when decoding data that is encoded with a set of prefix codes.

FIG. 4 is a flow chart that depicts, by way of overview, the method implemented in the handheld communications device 200 when decoding data that is encoded with a set of prefix codes.

At step S100, the handheld communications device 200 receives data that was encoded with the prefix code set. Typically, the handheld communications device 200 receives the encoded data over the wireless cellular network (via the primary transmitter/receiver 212 and the primary internal antenna 216) or the local area wireless network (via the secondary transmitter/receiver 214 and the secondary internal antenna 218). However, the handheld communications device 200 may also receive the encoded data via the data port 230.

Preferably, the prefix code set comprises a variable-length prefix code set that was used to entropy-encode the data. More preferably, the prefix code set comprises a Huffman prefix code table. As discussed earlier, Huffman tables are often used with the JPEG algorithm for compressing and decompressing the quantized image data. Therefore, typically the received data comprises an electronic image that is encoded with a Huffman table, and the handheld communications device 200 receives the Huffman table as a component of the electronic image.

However, the received data need not include a prefix code set or a Huffman table. Rather, the operating system of the handheld communications device 200 may include one or more standard prefix code sets, and the received data may specify the standard prefix code set that was used to encode the data.

Further, although the invention is advantageously used in association with compressed electronic images, the invention is not limited to decompressing electronic images. Rather, since Huffman tables can be used to encode data other than image data, the received data can comprise other encoded data types. For instance, the received data can comprise an encoded alphanumeric data stream. In addition, the prefix code table need not be a Huffman table, but may comprise other forms of prefix codes that can be used to encode and decode data streams.

At step S102, the compiler 304 of the handheld communications device 200 compiles machine code from the prefix code set. The machine code implements a binary prefix code tree that corresponds to the prefix code set. Where the prefix code set comprises a Huffman prefix code table, the machine code implements a Huffman tree. Further, the machine code is native to the data processing system 202, in the sense that the machine code is executable directly by the microprocessor 238 without any code conversion. Although the machine code implements a binary prefix code tree, in one of preferred embodiments (discussed below), the compiler 304 does not actually construct a prefix code tree prior to compiling the machine code.

At step S104, the data processing means 202 of the handheld communications device 200 decodes the data from the symbols that are encoded in the prefix code table. To do so, the microprocessor 238 executes the native machine code that was compiled at step S102, and thereby traverses the prefix code tree. Although the microprocessor 238 may access the RAM 226 and/or execute loop machine language opcodes to read the encoded data, preferably the microprocessor 238 does not access the RAM 226 or execute any loop opcodes when traversing the prefix code tree.

Figure 5A:
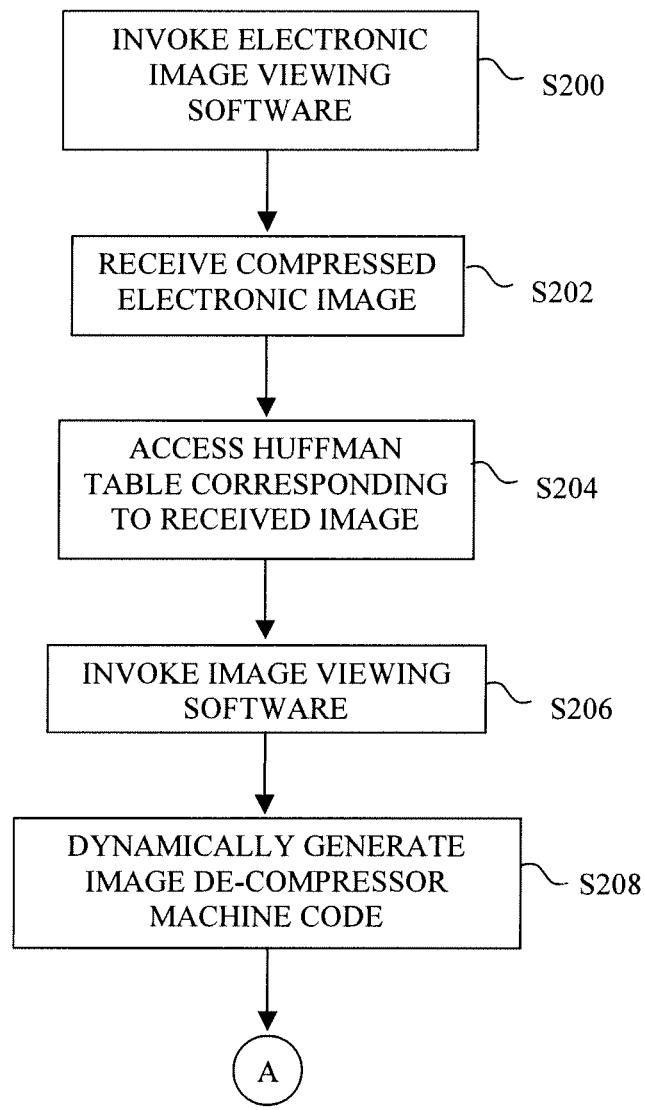
FIG. 5 (comprising FIGS. 5a to 5b) is a flow chart depicting, in detail, the method performed by the handheld communications device when decompressing an electronic image that comprises compressed image data, and a Huffman table.
Figure 5B:
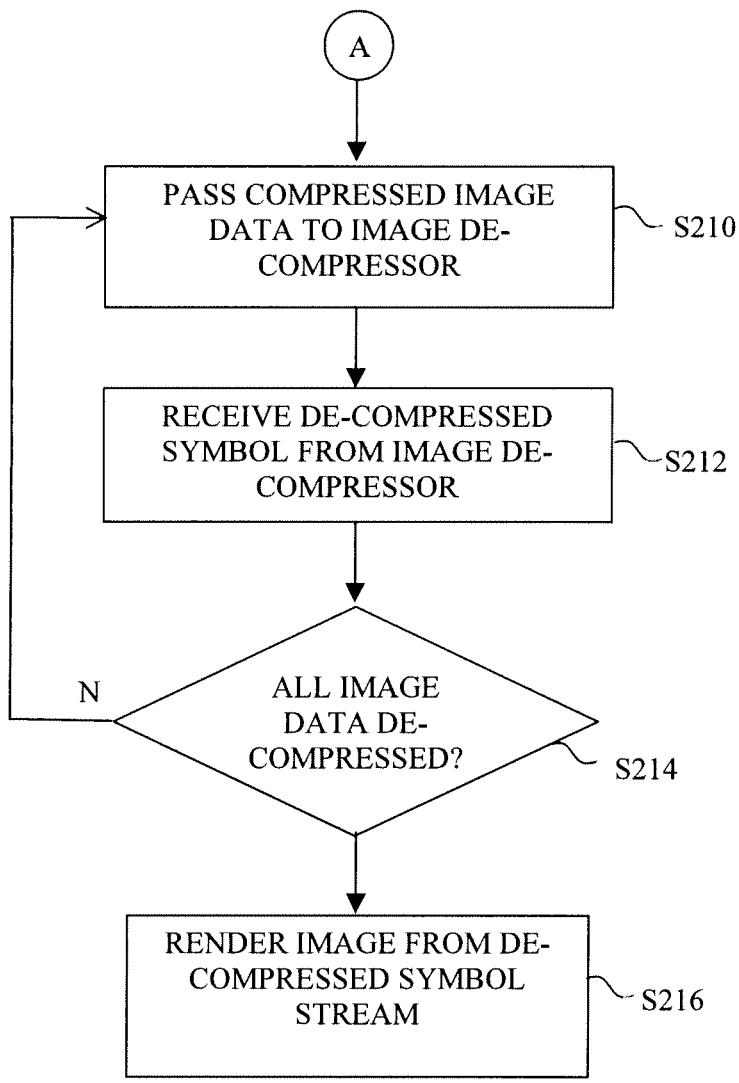

FIG. 5 depicts, in detail, the sequence of steps performed by the handheld communications device 200 when decompressing an electronic image that is compressed with a Huffman table.

At step S200, the user of the handheld communications device 200 invokes one of the image viewing software programs that is installed on the handheld communications device 200, and accesses the compressed electronic image with the invoked communication software. For instance, the user may invoke the internet browser, and access a compressed electronic image that is stored on a remote web server. Alternately, the user may invoke the still image viewer, and access a compressed electronic image that is saved in the flash memory 224 or the RAM 226.

At step S202, the invoked software program receives the compressed electronic image. As discussed above, the user may invoke the internet browser, in which case the image viewing software program receives the electronic image over the wireless cellular network or the local area wireless network. Alternately, the user may invoke the still image viewer, in which case the image viewing software program accesses the electronic image from the flash memory 224 or the RAM 226.

Preferably, the electronic image received at step S202 comprises compressed image data, and a Huffman table. More preferably, the electronic image comprises a JPEG image. Accordingly, at step S204, preferably the invoked software program extracts the Huffman table from the image file header.

However, as discussed above, the compressed electronic image is not limited to a JPEG image, but may comprise other image data streams that are encoded with a Huffman table. Accordingly, in one variation, the received image data does not actually include a Huffman table, but instead explicitly or implicitly refers to a standard Huffman table. In this case, at step S204 the image viewing software program accesses the standard Huffman table that is associated with the received image data.

At step S206, the invoked software program invokes the JIT compiler 304 to assist with the decompression of the compressed image data. In response, at step S208, the JIT compiler 304 dynamically generates machine code that defines an image de-compressor procedure. The image de-compressor machine code runs natively on the microprocessor 238, and implements a machine-code-based Huffman tree that corresponds to the Huffman table. Two algorithms which the JIT compiler 304 may use to dynamically generate the image de-compressor machine code will be discussed below, with reference to FIGS. 6 to 8.

At step S210, the image viewing software program calls the image de-compressor procedure, passing the compressed image data to the image de-compressor procedure. Preferably, the image viewing software program passes the compressed image data to the image de-compressor procedure via one of the internal registers of the microprocessor 238.

At step S212, in response the image viewing software program receives a de-compressed symbol corresponding to the compressed image data. Preferably, the image de-compressor procedure passes the de-compressed symbol to the invoked software program via one of the internal registers of the microprocessor 238.

As shown by step S214, the image viewing software program repeatedly calls the image de-compressor procedure until all of the received compressed image data has been de-compressed. The image viewing software program then renders the corresponding image from the decompressed symbol stream, at step S216. Alternately, the image viewing software program may render the image dynamically as it receives the de-compressed symbol stream from the image de-compressor procedure.

Two sample algorithms for generating the image de-compressor machine code will now be described, with reference to FIGS. 6 to 9. In these examples, it is assumed that the invoked image viewing software program has the following Huffman table data:

TABLE 1

| Huffman Prefix Code | Symbol |
| --- | --- |
| B'00' | A |
| B'01' | B |
| B'100' | C |
| B'101' | D |
| B'1100' | E |

Figure 6:
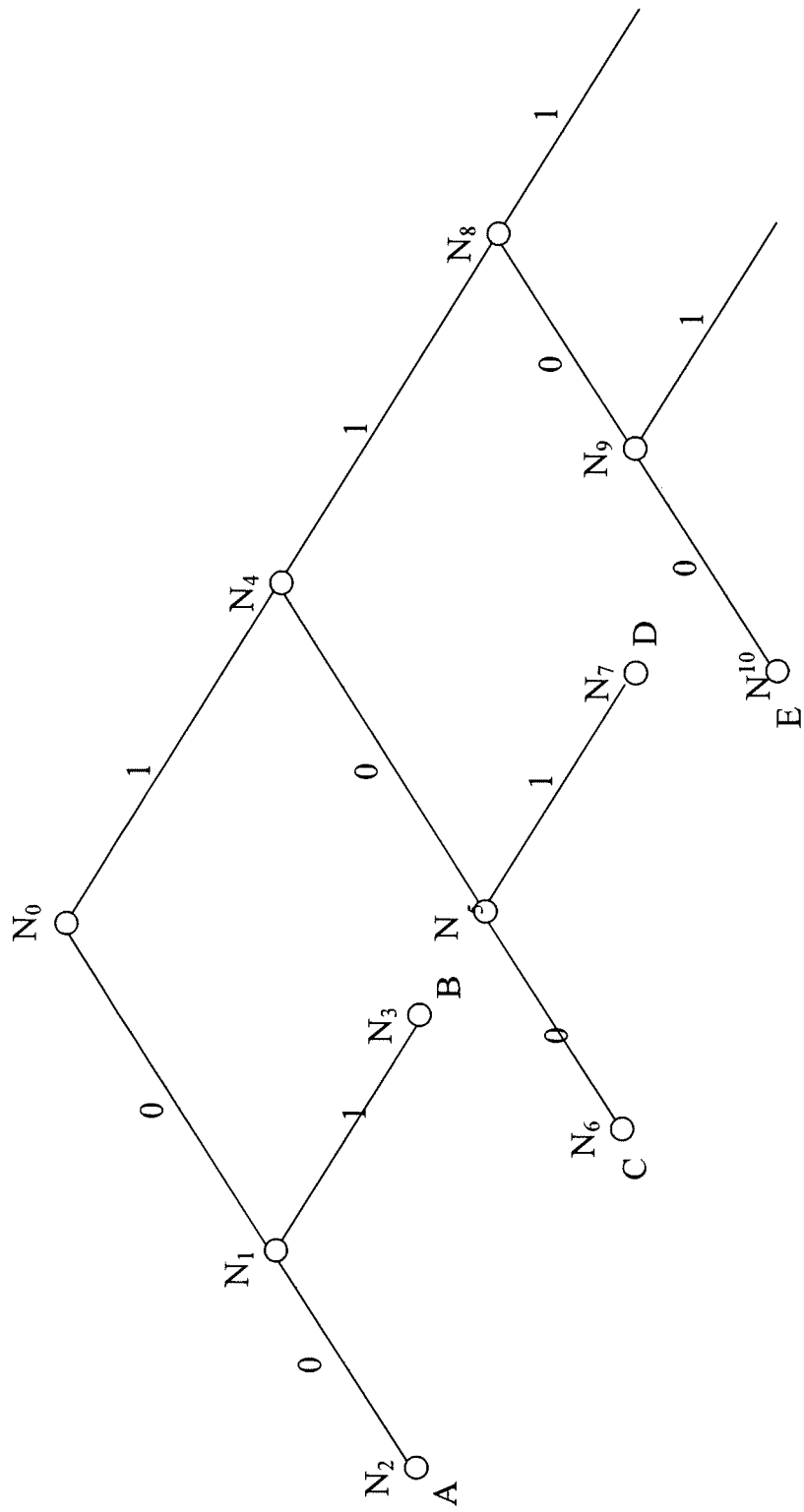
FIG. 6 is a sample Huffman tree depicting Huffman table data.

FIG. 6 is a Huffman tree that corresponds to the aforementioned Huffman table data. In the tree, the Huffman prefix codes B'111' and B'1101' are not associated with any symbol. A discussion of the procedure for constructing the Huffman tree from the Huffman table data is omitted since suitable procedures for constructing the Huffman tree would be well known to persons skilled in this field of technology.

Figure 7:
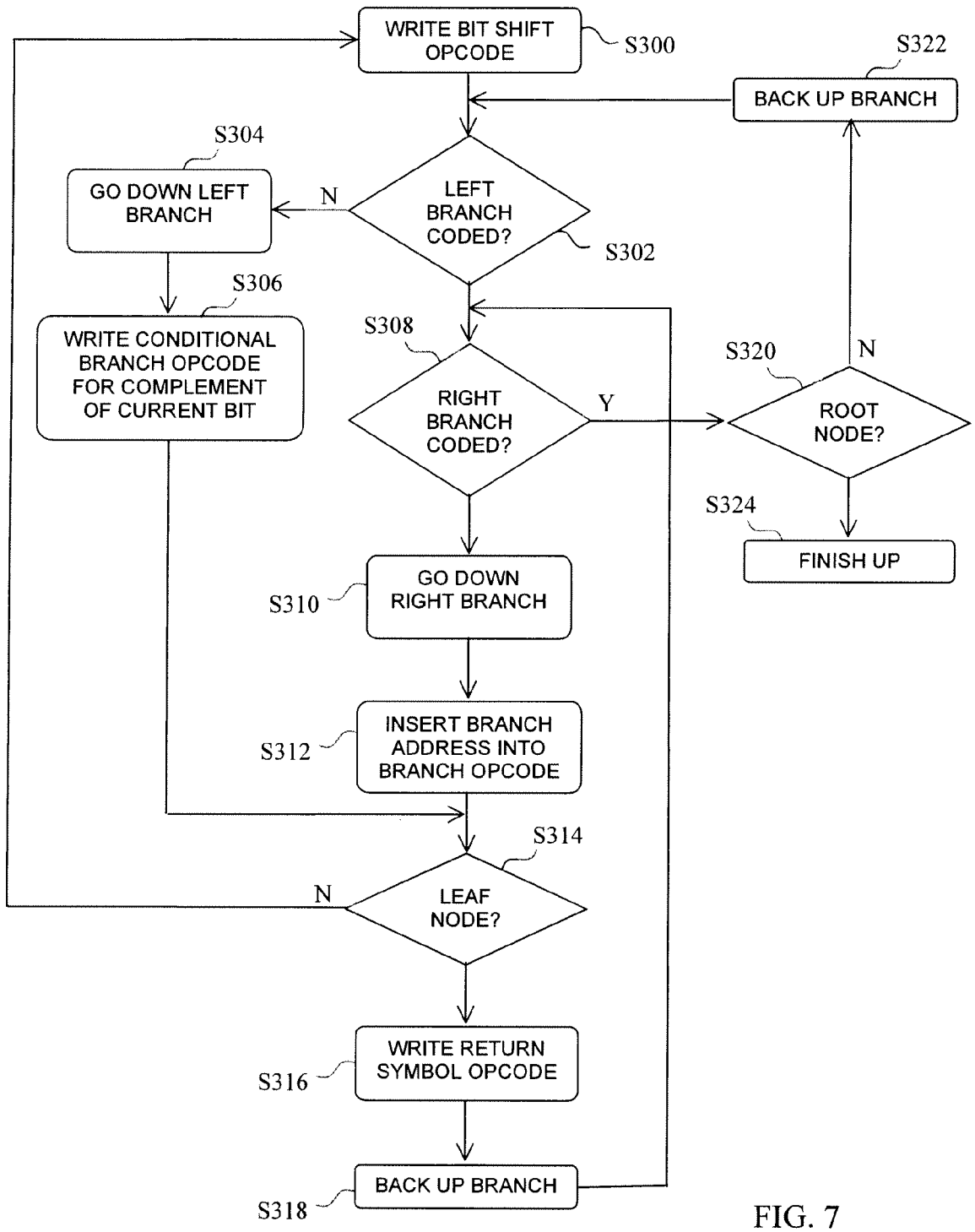
FIG. 7 is a flowchart that depicts one algorithm which the JIT compiler may use to dynamically generate native machine code which defines an image de-compressor.

FIG. 7 is a flowchart that depicts one algorithm which the JIT compiler 304 may use to dynamically generate the image de-compressor machine code from the Huffman tree depicted in FIG. 6. Initially, the JIT compiler begins compiling the image de-compressor machine code from the root node (N0) of the Huffman tree.

At step S300, the JIT compiler 304 assigns a current address pointer to the starting memory address in the RAM 226 for the image de-compressor procedure, and writes a shift opcode into this starting memory location. Preferably, the shift is a left shift bit opcode which, when executed by the microprocessor 238, causes the microprocessor 238 to shift the contents of one of its internal general purpose data registers to the left. The invoked software program will pass the compressed image data to the image de-compressor procedure via this data register. Therefore, after execution of the shift opcode, the data register will contain a shifted version of the compressed image data, and the status register of the microprocessor 238 will indicate whether the bit that was shifted out of the data register (the most significant bit) was B'0' or B'1'.

At step S302, the JIT compiler 304 determines whether the left branch of the current node has been coded. Since the JIT compiler 304 will begin compiling from the root node of the Huffman tree, initially neither the left branch nor the right branch of the root node will have been coded. If the JIT compiler 304 determined, at step S302, that the left branch of the current node was already coded, the JIT compiler 304 jumps to step S308 for coding of the right branch.

On the other hand, if the JIT compiler 304 determined, at step S302, that the left branch of the current node was not already coded, at step S304 the JIT compiler 304 takes the left branch of the current node. At step S306, the JIT compiler 304 advances the current address pointer to the next memory address, and then writes a conditional branch opcode into this new current memory location. The conditional branch opcode, when executed by the microprocessor 238, causes the microprocessor 238 to branch to the memory address specified in the conditional branch opcode if the condition specified in the opcode is satisfied.

Preferably, the conditional branch opcode causes the microprocessor 238 to branch to the specified memory address if the bit that was shifted out of the general purpose register at step S302 was the compliment of the bit associated with the current branch of the Huffman tree. For instance, in the Huffman tree depicted in FIG. 6, the left branch from the root node is associated with the bit B'0'. Therefore, the conditional branch opcode that is written at step S306 will cause the microprocessor 238 to branch to the specified memory address if the bit that was shifted out of the general purpose register at step S302 was B'1'. Processing then continues at step S314.

At step S314, the JIT compiler 304 stops at the next lowest node of the current branch, and then determines whether this node is a leaf node of the Huffman tree (i.e. coding for the current branch is complete). If the new current node is not a leaf node, the JIT compiler 304 returns to step S300 for processing of the new current node.

On the other hand, if the new current node is a leaf node, the JIT compiler 304 advances the current address pointer to the next memory address, and then writes a return opcode into this new current memory location, at step S316. The return opcode, when executed by the microprocessor 238, causes the microprocessor 238 to return to the calling procedure (the image viewing software program that was invoked at step S206) the symbol that was associated with the current node. The JIT compiler 304 then moves back up the current branch to the preceding node, at step S318, and then jumps to step S308 for further processing of the preceding node (the new current node).

At step S308, the JIT compiler 304 determines whether the right branch of the current node has been coded. If the JIT compiler 304 determined, at step S308, that the right branch of the current node was not already coded, at step S310 the JIT compiler 304 takes the right branch of the current node. At step S312, the JIT compiler 304 advances the current address pointer to the next memory address, and then inserts the value of the current address pointer into the conditional branch opcode that was written at step S306. Processing then continues at step S314 for determination of whether the next lowest node of the current branch is a leaf node.

If the JIT compiler 304 determined, at step S308, that the right branch of the current node was already coded, the JIT compiler 304 jumps to step S320 since both branches of the current node will have been coded. At step S320, the JIT compiler 304 determines whether the current node is the root node of the Huffman tree. If the current node is not the root node, the JIT compiler 304 moves back up the current branch to the preceding node, at step S322, and then jumps to step S302 for further processing of the preceding node (the new current node).

On the other hand, if the JIT compiler 304 determined, at step S320, that the current node is the root node of the Huffman tree, further processing of the Huffman tree will be terminated since all branches of the Huffman tree will have been coded.

The following tables trace the generation of the image de-compressor machine code, as the JIT compiler 304 executes the algorithm of FIG. 7 against the Huffman tree depicted in FIG. 6.

Node N0 (step S300):
BEGIN: SHIFT LEFT
Node N1 (steps S302, S304, S306, S314, S300):
BEGIN: SHIFT LEFT
  IF CF=1, GO TO < >
  SHIFT LEFT
Node N2 (steps S302, S304, S306, S314, S316):
BEGIN: SHIFT LEFT
  IF CF=1, GO TO < >
  SHIFT LEFT
  IF CF=1, GO TO < >
  RETURN SYMBOL "A"; Prefix=B'00
Node N3 (steps S318, S308, S310, S312, S314, S316):
BEGIN: SHIFT LEFT
  IF CF=1, GO TO < >
  SHIFT LEFT
  IF CF=1, GO TO <Addr1>
  RETURN SYMBOL "A"; Prefix=B'00
Addr1: RETURN SYMBOL "B"; Prefix=B'01
Node N4 (steps S318, S308, S320, S322, S302, S308, S310, S312, S314, S300):
BEGIN: SHIFT LEFT
  IF CF=1, GO TO <Addr2>
  SHIFT LEFT
  IF CF=1, GO TO <Addr1>
  RETURN SYMBOL "A"; Prefix=B'00
Addr1: RETURN SYMBOL "B"; Prefix=B'01
Addr2: SHIFT LEFT
Node N5 (steps S302, S304, S306, S314, S300):
BEGIN: SHIFT LEFT
  IF CF=1, GO TO <Addr2>
  SHIFT LEFT
  IF CF=1, GO TO <Addr1>
  RETURN SYMBOL "A"; Prefix=B'00
Addr1: RETURN SYMBOL "B"; Prefix=B'11
Addr2: SHIFT LEFT
  IF CF=1, GO TO < >
  SHIFT LEFT
Node N6 (steps S302, S304, S306, S314, S316):
BEGIN: SHIFT LEFT
  IF CF=1, GO TO <Addr2>
  SHIFT LEFT
  IF CF=1, GO TO <Addr1>
  RETURN SYMBOL "A"; Prefix=B'00
Addr1: RETURN SYMBOL "B"; Prefix=B'01
Addr2: SHIFT LEFT
  IF CF=1, GO TO < >
  SHIFT LEFT
  IF CF=1, GO TO < >
  RETURN SYMBOL "C"; Prefix=B'100
Node N7 (steps S318, S308, S310, S312, S314, S316):

BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO < >
 SHIFT LEFT
 IF CF=1, GO TO <Addr3>
 RETURN SYMBOL "C"; Prefix=B'100
Addr3: RETURN SYMBOL "D"; Prefix=B'101
 Node N8 (steps S318, S308, S320, S322, S302, S308, S310, S312, S314, S300):
BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO <Addr4>
 SHIFT LEFT
 IF CF=1, GO TO <Addr3>
 RETURN SYMBOL "C"; Prefix=B'100
Addr3: RETURN SYMBOL "D"; Prefix=B'101
Addr4: SHIFT LEFT
 Node N9 (steps S302, S304, S306, S314, S300):
BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO <Addr4>
 SHIFT LEFT
 IF CF=1, GO TO <Addr3>
 RETURN SYMBOL "C"; Prefix=B'100
Addr3: RETURN SYMBOL "D"; Prefix=B'101
Addr4: SHIFT LEFT
 IF CF=1, GO TO < >
 SHIFT LEFT
 Node N10 (steps S302, S304, S306, S314, S316):
BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO <Addr4>
 SHIFT LEFT
 IF CF=1, GO TO <Addr3>
 RETURN SYMBOL "C"; Prefix=B'100
Addr3: RETURN SYMBOL "D"; Prefix=B'101
Addr4: SHIFT LEFT
 IF CF=1, GO TO < >
 SHIFT LEFT
 IF CF=1, GO TO < >
 RETURN SYMBOL "E"; Prefix=B'1100
 Error Node (steps S318, S308, S310, S312, S314, S316):
BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO <Addr4>
 SHIFT LEFT
 IF CF=1, GO TO <Addr3>
 RETURN SYMBOL "C"; Prefix=B'100
Addr3: RETURN SYMBOL "D"; Prefix=B'101
Addr4: SHIFT LEFT
 IF CF=1, GO TO < >
 SHIFT LEFT
 IF CF=1, GO TO <Addr5>
 RETURN SYMBOL "E"; Prefix=B'1100
Addr5: RETURN ERROR; Prefix=B'1101
 Error Node (steps S318, S308, S320, S322, S302, S308, S310, S312, S314, S316):
BEGIN: SHIFT LEFT
 IF CF=1, GO TO <Addr2>
 SHIFT LEFT
 IF CF=1, GO TO <Addr1>
 RETURN SYMBOL "A"; Prefix=B'00
Addr1: RETURN SYMBOL "B"; Prefix=B'01
Addr2: SHIFT LEFT
 IF CF=1, GO TO <Addr4>
 SHIFT LEFT
 IF CF=1, GO TO <Addr3>
 RETURN SYMBOL "C"; Prefix=B'100
Addr3: RETURN SYMBOL "D"; Prefix=B'101
Addr4: SHIFT LEFT
 IF CF=1, GO TO <Addr6>
 SHIFT LEFT
 IF CF=1, GO TO <Addr5>
 RETURN SYMBOL "E"; Prefix=B'1100
Addr5: RETURN ERROR; Prefix=B'1101
Addr6: RETURN ERROR; Prefix=B'111

Figure 8:
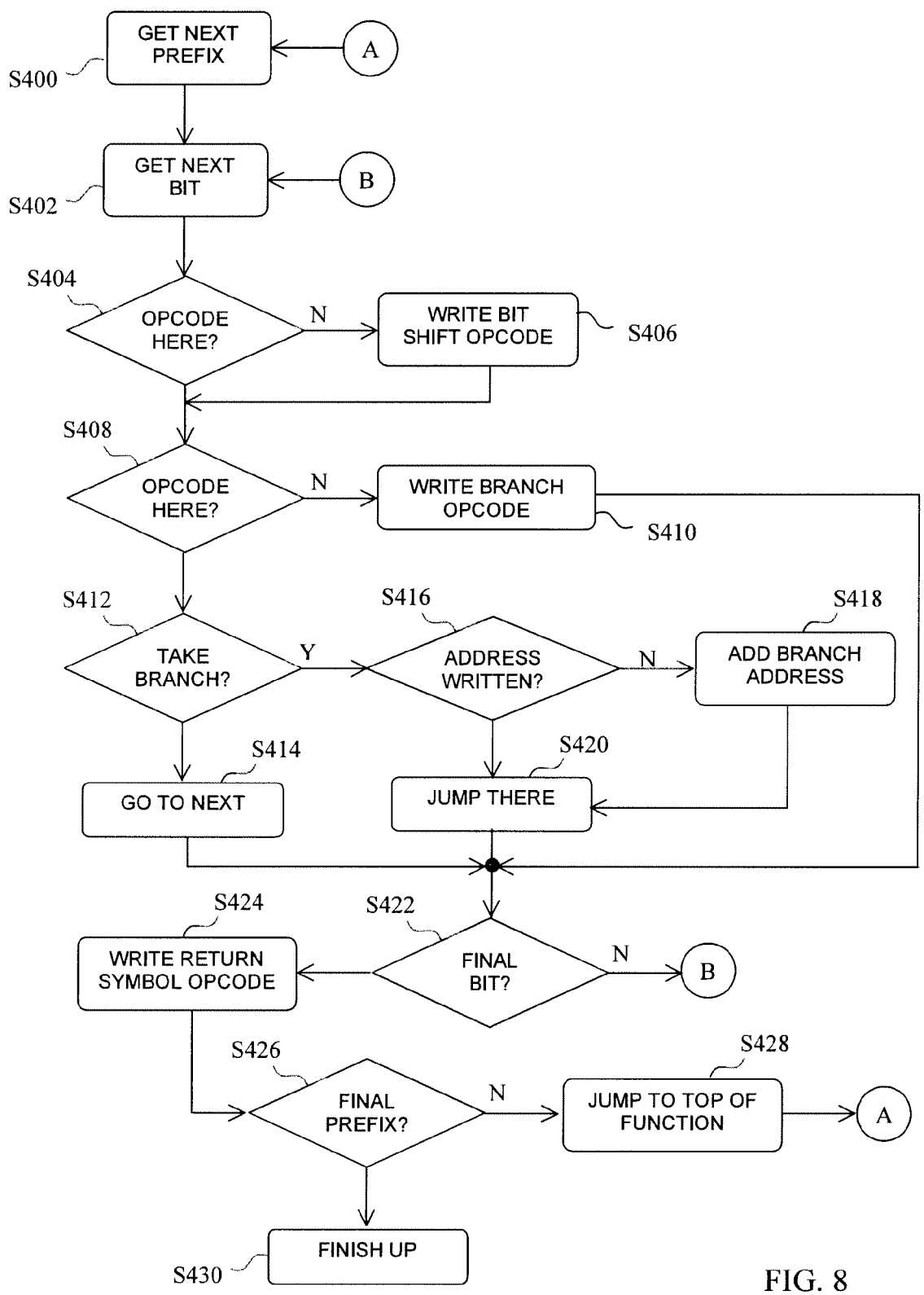
FIG. 8 is a flowchart that depicts a preferred algorithm which the JIT compiler uses to dynamically generate the native machine code, without constructing a Huffman tree.

One limitation of the algorithm of FIG. 7 is that it must construct a Huffman tree in RAM 226, even though the image de-compressor does not actually use the Huffman tree to decode the compressed image data. FIG. 8 is a flowchart that depicts a preferred algorithm which the JIT compiler 304 uses to dynamically generate the image de-compressor machine code. The algorithm of FIG. 8 is similar to the algorithm of FIG. 7, in that the resulting image de-compressor machine code still implements a Huffman tree. However, in contrast to the algorithm of FIG. 7, the algorithm of FIG. 8 does not require the JIT compiler 304 to construct a Huffman tree to generate the machine code.

Initially, the JIT compiler 304 assigns a current address pointer to the starting memory address in the RAM 226 for the image de-compressor procedure. Then, at step S400, the JIT compiler 304 reads the first Huffman code prefix. At step S402, the JIT compiler 304 reads the first bit of the first Huffman code prefix.

At step S404, the JIT compiler 304 determines whether an opcode has already been written to the current memory location. Initially, the current memory location will not contain any opcode. However, as will become apparent, as the algorithm continues to execute, the current memory location may contain a shift opcode from a previous write step. Accordingly, step S404 speeds up the compilation process by avoiding writing to the RAM 226 if the current memory location already contains a shift opcode.

If the JIT compiler 304 determines, at step S404, that the current memory location does not contain an opcode, at step S406 the JIT compiler 304 writes a shift opcode into the current memory location. Preferably, the shift opcode is a left shift bit opcode which, when executed by the microprocessor 238, causes the microprocessor 238 to shift the contents of one of its internal general purpose data registers to the left. As above, the image viewing software program will pass the compressed image data to the image de-compressor procedure via this data register. Therefore, after execution of the shift opcode, the data register will contain a shifted version of the compressed image data, and the status register of the microprocessor 238 will indicate whether the bit that was shifted out of the data register (the most significant bit) was B'0' or B'1'.

At step S408, the JIT compiler 304 advances the current address pointer, and then determines whether an opcode has already been written to the current memory location. Initially, the current memory location will not contain any opcode. However, as will become apparent, as the algorithm continues to execute, the current memory location may contain a conditional branch opcode from a previous write step. Since a conditional branch opcode may contain a branch address, if the current memory location already contains a conditional branch opcode step S408 ensures that the JIT compiler 304 does not erase that branch address.

However, if the JIT compiler 304 determines, at step S408, that the current memory location does not contain an opcode, at step S410 the JIT compiler 304 writes a conditional branch opcode into the current memory location, and then advances the current address pointer. Processing then continues at step S422.

The conditional branch opcode, when executed by the microprocessor 238, causes the microprocessor 238 to branch to the memory address specified in the conditional branch opcode if the condition specified in the branch opcode is satisfied. The conditional branch opcode written at step S410 will not include the target memory address. This missing parameter will be specified at step S416.

The conditional branch opcode causes the microprocessor 238 to branch to the specified memory address if the bit that is shifted out of the general purpose register by the shift opcode (in the preceding memory location) is the compliment of the current bit (as determined at step S402). For instance, if the first Huffman prefix code to be coded is B'00', the first bit will be B'0', in which case the conditional branch opcode that is written at step S408 will cause the microprocessor 238 to branch to the specified memory address if the bit that was shifted out of the general purpose register by the preceding shift opcode is B'1'.

If the JIT compiler 304 determines, at step S408, that the current memory location already contains a conditional branch opcode, processing continues at step S412. At step S412, the JIT compiler 304 determines whether the current bit matches the condition specified in the conditional branch opcode. If not, the JIT compiler 304 simply advances the current address pointer at step S414, since the branch has not yet been taken. Processing then continues at step S422.

On the other hand, if the JIT compiler 304 determines, at step S412, that the current bit matches the condition specified in the conditional branch opcode, the JIT compiler 304 determines, at step S416, whether the conditional branch opcode already contains a branch address. If not, the JIT compiler 304 inserts the last current address into the conditional branch opcode, at step S418, since the last current address will be the address of memory location that follows the last opcode that was written (at step S406 or step S424) into the RAM 226. Processing then continues at step S422.

However, if the JIT compiler 304 determines, at step S416, that the conditional branch opcode already contains a branch address, the JIT compiler 304 advances the current address pointer to the specified branch address, at step S420, and then proceeds to step S422.

At step S422, the JIT compiler 304 determines whether the current bit is the last bit of the current Huffman prefix code. If not, the JIT compiler 304 proceeds to step S402 where it reads the next bit of the current Huffman prefix code. Processing then continues with the new current bit, as discussed above.

However, if the JIT compiler 304 determines, at step S422, that the current bit is the last bit of the current Huffman prefix code, at step S424 the JIT compiler 304 writes a return opcode into the current memory location which, when executed by the microprocessor 238, causes the microprocessor 238 to return the value of the associated symbol to the image viewing software program that invoked the image de-compressor procedure.

At step S426, the JIT compiler 304 determines whether the current prefix code is the last prefix code to be encoded into the image de-compressor procedure. If not, the JIT compiler 304 proceeds to step S400 where it reads the next Huffman prefix code. Otherwise, processing terminates at step S430 by inserting the last current address into each of the conditional branch opcodes for which a target branch address was not previously specified. The JIT compiler 304 also writes a return opcode into the last current memory location, thereby causing the image de-compressor procedure to return an error code symbol for any erroneous Huffman prefix codes received from the calling software program.

Table 2 is a pseudo-code implementation of the algorithm of FIG. 8.

TABLE 2

```
For Each HuffmanCode
    CurrentAddress = Start of function
    For Each Bit in HuffmanCode
// If no opcode exists, insert a shift opcode (if an opcode does exists,
// it will be a shift operation)
        If OPCode at CurrentAddress is Not Set
            Insert shift instruction at CurrentAddress
            Advance CurrentAddress
            EndOfFunction = CurrentAddress
        Else
            Advance CurrentAddress
        End If
// The opcode after the shift will be a branch. If it does not exists,
// insert a branch opcode (fill in destination address later). Set the
// condition of the branch to compliment of the current Bit (!Bit), so that
// the branch will be skipped by the CPU if it is processing the
// current Bit (this is more efficient)
        If OpCode at CurrentAddress is Not set
            Insert branch instruction without address filled in,
            branch condition set to !Bit
            Advance CurrentAddress
            EndOfFunction = CurrentAddress
        Else
// CurrentAddress points to a branch instruction. Retrieve
// dstination address and condition of branch instruction.
            BranchAddress = GetBranchAddress(CurrentAddress)
            BranchCondition = GetBranchCondition(CurrentAddress)
// Take the branch if the branch condition matches the current Bit.
// Otherwise, skip Over branch instruction. If branch instruction does
// not have an address set, set it to the end of the fuction (where
// new instructions are inserted)
            If BranchCondition = Bit
                If BranchAddress is Not Set
// Fill in the branch address since branch is being taken (the branch
// will point to the current end of the function, which will soon
// contain instructions)
                    Set Branch Address to EndOfFunction
                    Set CurrentAddress to EndOfFunction
```

TABLE 2-continued

```
                Else
// Jump to the address specified in the branch
                    Set CurrentAddress to BranchAddress
                End If
            Else
// Skip over branch instruction; condition did not match current Bit
                Advanced CurrentAddress
            End If
        End If
// Insert epilog section if entire symbol has been decoded. Typically,
// epilog instructions return symbol associated with the Huffman Code
        If Bit is last in HuffmanCode
            Insert epilog instructions at CurrentAddress
            Advanced CurrentAddress
                EndOfFunction = CurrentAddress
        End If
    Next Bit
Next HuffmanCode
// The SymbolNotFound instructions will typically cause subroutine to
// return with an error code
Insert SymbolNotFound instructions at EndOfFunction
// Fill in address for any leftover branches which are not set (which
// represent "invalid" or unused Huffman codes)
For each Instruction in Generated Function
    If Instruction is Branch and Address is Not Set
        Set Branch Address to EndOfFunction
    End If
Next Instruction
```

Table 3 contains Intel XScale processor opcodes for an image de-compressor that would be produced by the JIT compiler 304 after executing the pseudo-code of Table 2 against the Huffman tree depicted in FIG. 6. The opcodes included in Table 3 have the following meanings:

LSL R#, R#, #—Logical Shift Left register R# by # of bits specified. The bit shifted out is shifted into the "carry" bit of the CPU flags register.

BCS <label>—Branch if Carry Set.
If the carry bit is set in the CPU flags register, jump to the label specified. If the carry bit is not set, the instruction does nothing and execution continues at the following instruction.

BCC <label>—Branch if Carry Clear (not seen in this code).
If the carry bit is not set in the CPU flags register, jump to the label specified. If the carry bit is set, the instruction does nothing and execution continues at the following instruction.

MOV R#, #—Move the immediate # into R#
BX LR—Exit subroutine, return to caller
Huff_##—Label

TABLE 3

| | |
|---|---|
| HuffFunc; | Function entrypoint |
| | LSL R0,R0,#1 |
| | BSC Huff_18 |
| | LSL R0,R0,#1 |
| | BSC Huff_10 |
| | MOV R1, "A" |
| | BX LR |
| Huff_10 | MOV R1, "B" |
| | BX LR |
| Huff_18 | LSL R0,R0,#1 |
| | BCS Huff_30 |
| | LSL R0,R0,#1 |
| | BCS Huff_28 |
| | MOV R1, "C" |
| | BX LR |
| Huff_28 | MOV R1, "D" |
| | BX LR |
| HUff_30 | LSL R0,R0,#1 |
| | BCS Huff_3e |

TABLE 3-continued

| | |
|---|---|
| | LSL R0,R0,#1 |
| | BCS Huff_3e |
| | MOV R1, "E" |
| Huff_3e | BX LR |

Figure 9:
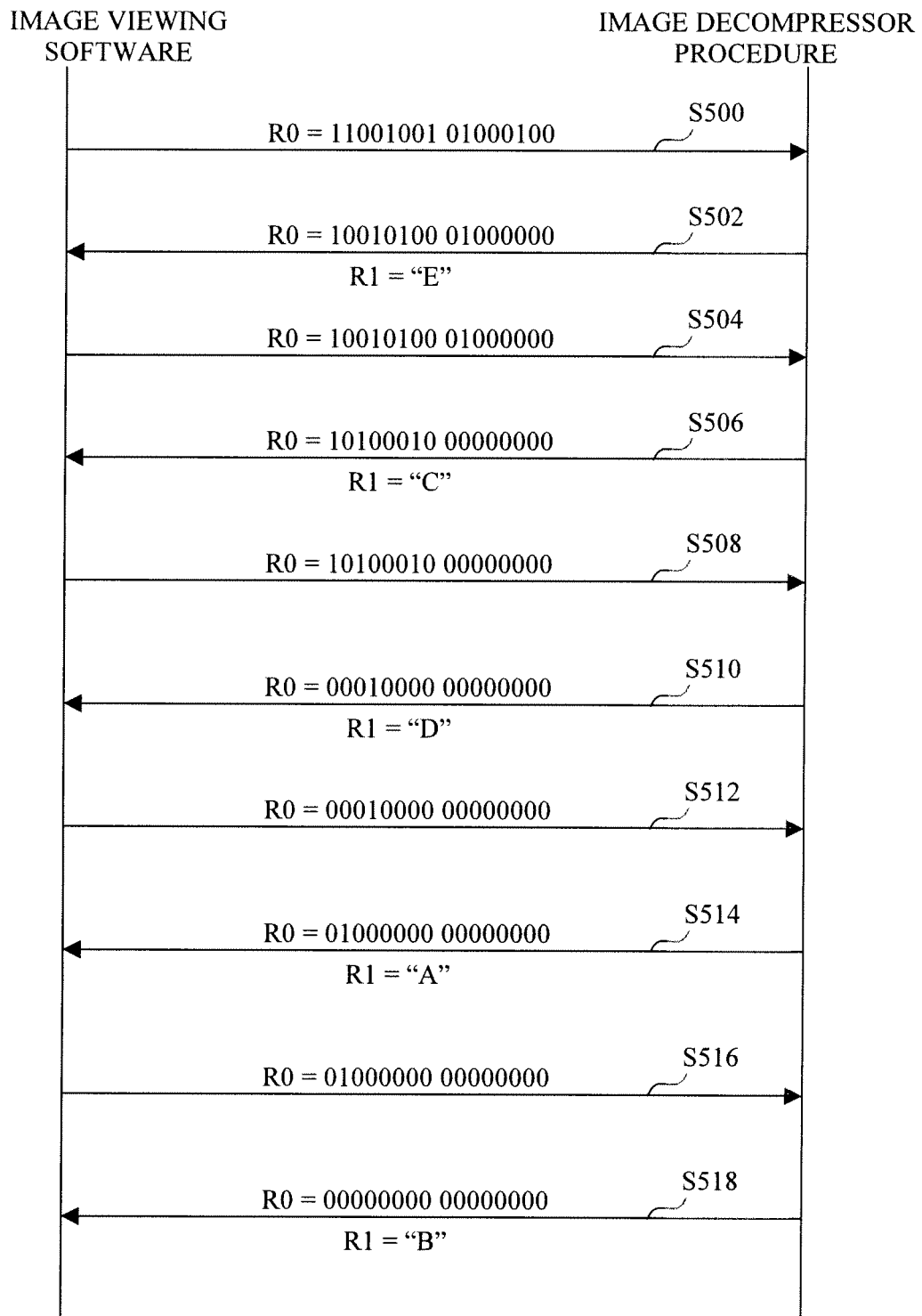
FIG. 9 is data flow diagram depicting the encoded data stream that is transferred to the image de-compressor, and the decoded data stream that is received from the image de-compressor.

The operation of the image de-compressor procedure of Table 3 will be discussed with reference to data flow diagram of FIG. 9. In this example, image viewing software program passes a compressed image data stream to the image de-compressor procedure via the general purpose register R0, and receives the decompressed symbol stream from the image de-compressor procedure via the general purpose register R1.

At step S500, the image viewing software program calls the image de-compressor procedure, with R0=11001001 01000100 (i.e. Huffman prefix codes E, C, D, A, B). In response, the microprocessor 238 executes the LSL R0,R0,#1 instruction, which shifts the contents of register R0 one bit left, thereby setting the carry flag. After this step, R0=10010010 10001000.

The microprocessor 238 then executes the BCS Huff_18 instruction. Since the carry flag is set, this instruction directs the microprocessor 238 to branch to the Huff_18 memory location. The microprocessor 238 executes the LSL R0,R0,#1 instruction (at Huff_18), which shifts the contents of register R0 one bit left, thereby setting the carry flag. After this step, R0=00100101 00010000.

The microprocessor 238 then executes the BCS Huff_30 instruction. Since the carry flag is set, this instruction directs the microprocessor 238 to branch to the Huff_30 memory location. The microprocessor 238 executes the LSL R0,R0,#1 instruction (at Huff_30), which shifts the contents of register R0 one bit left, thereby clearing the carry flag. After this step, R0=01001010 00100000.

The microprocessor 238 then executes the BCS Huff_3e instruction. Since the carry flag is clear, this instruction directs the microprocessor 238 to ignore the branch, and execute the following LSL R0,R0,#1 instruction. The microprocessor 238 shifts the contents of register R0 one bit left, thereby clearing the carry flag. After this step, R0=10010100 01000000.

The microprocessor 238 then executes the following BCS Huff_3e instruction. Since the carry flag is clear, this instruction directs the microprocessor 238 to ignore the branch, and execute the MOV R1, "E" instruction. The microprocessor 238 loads register R1 with specified symbol, and returns to the image viewing software program, at step S502. After this step, R0=10010100 01000000.

At step S504, the image viewing software program calls the image de-compressor procedure again, with R0=10010100 01000000 (i.e. Huffman prefix codes C, D, A, B). In response, the microprocessor 238 executes the LSL R0,R0,#1 instruction, which shifts the contents of register R0 one bit left, thereby setting the carry flag. After this step, R0=00101000 10000000.

The microprocessor 238 then executes the BCS Huff_18 instruction. Since the carry flag is set, this instruction directs the microprocessor 238 to branch to the Huff_18 memory location. The microprocessor 238 executes the LSL R0,R0,#1 instruction (at Huff_18), which shifts the contents of register R0 one bit left, thereby clearing the carry flag. After this step, R0=01010001 00000000.

The microprocessor 238 then executes the BCS Huff_30 instruction. Since the carry flag is clear, this instruction directs the microprocessor 238 to ignore the branch, and execute the following LSL R0,R0,#1 instruction. The microprocessor 238 shifts the contents of register R0 one bit left, thereby clearing the carry flag. After this step, R0=10100010 00000000.

The microprocessor 238 then executes the following BCS Huff_28 instruction. Since the carry flag is clear, this instruction directs the microprocessor 238 to ignore the branch, and to execute the MOV R1, "C" instruction. The microprocessor 238 loads register R1 with specified symbol, and returns to the image viewing software program, at step S506. After this step, R0=101000010 00000000.

At step S508, the image viewing software program calls the image de-compressor procedure again, with R0=10100010 00000000 (i.e. Huffman prefix codes D, A, B). In response, the microprocessor 238 executes the LSL R0,R0,#1 instruction, which shifts the contents of register R0 one bit left, thereby setting the carry flag. After this step, R0=01000100 00000000.

The microprocessor 238 then executes the BCS Huff_18 instruction. Since the carry flag is set, this instruction directs the microprocessor 238 to branch to the Huff_18 memory location. The microprocessor 238 executes the LSL R0,R0,#1 instruction (at Huff_18), which shifts the contents of register R0 one bit left, thereby clearing the carry flag. After this step, R0=10001000 00000000.

The microprocessor 238 then executes the BCS Huff_30 instruction. Since the carry flag is clear, this instruction directs the microprocessor 238 to ignore the branch, and to execute the following LSL R0,R0,#1 instruction. The microprocessor 238 shifts the contents of register R0 one bit left, thereby setting the carry flag. After this step, R0=00010000 00000000.

The microprocessor 238 then executes the BCS Huff_28 instruction. Since the carry flag is set, this instruction directs the microprocessor 238 to branch to the Huff_28 memory location. The microprocessor 238 executes the MOV R1, "D" instruction (at Huff_28). The microprocessor 238 loads register R1 with the specified symbol, and returns to the image viewing software program, at step S510. After this step, R0=00010000 00000000.

Further detailed analysis of the image de-compressor procedure is not required. At step S512, the image viewing software program calls the image de-compressor procedure again, with R0=00010000 00000000 (i.e. Huffman prefix codes A, B). In response, the microprocessor 238 loads register R1 with the symbol "A", and returns to the image viewing software program, at step S514. After this step, R0=01000000 00000000.

At step S516, the image viewing software program calls the image de-compressor procedure again, with R0=01000000 00000000 (i.e. Huffman prefix code B). In response, the microprocessor 238 loads register R1 with the symbol "B", and returns to the image viewing software program, at step S518. After this step, R0=00000000 00000000.

As will be apparent, the image de-compressor receives the image data stream via general purpose register R0, and returns the corresponding decompressed symbol data stream via general purpose register R1, without the microprocessor 238 performing time-consuming lookups to the RAM 226 to access a Huffman tree. Further, although the image viewing software program that invoked the image de-compressor may access the RAM 226 and/or execute loop machine language opcodes to read the encoded data stream, the image de-compressor traverses the machine-code-based Huffman tree without the microprocessor 238 performing time-consuming looping operations. As a result, the speed of the image decoding operation is improved over conventional image decoding algorithms.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

The invention claimed is:

1. A method of decoding, at a computing device, data compressed according to a binary prefix code tree, the method comprising the steps of:
   receiving at said computing device data encoded with a set of prefix codes;
   in response to receiving the encoded data at the computing device, writing native machine code for execution by the computing device, the native machine code representing the binary prefix code tree corresponding to the prefix code set, the native machine code including branch opcodes that each correspond to one of a plurality of internal nodes of the binary prefix code tree, shift opcodes that each correspond to an outcome of one of the branch opcodes, and return opcodes that each correspond to one of a plurality of leaf nodes of the binary prefix code tree, and the native machine code excluding memory access opcodes and loop opcodes; and
   decoding the encoded data by executing the native machine code at the computing device.

2. The method according to claim 1, wherein the computing device comprises a processing unit and a main memory coupled to the processing unit, and the executing the native machine code comprises executing the native machine code at the processing unit and accessing the encoded data stored in the main memory without accessing a constructed representation of the prefix code tree.

3. The method according to claim 1, wherein the computing device comprises a data register storing a portion of the encoded data, at least one of the branch opcodes comprises a first bit-test opcode corresponding to a first one of the nodes, and the executing the native machine code comprises executing the first bit-test opcode in association with the data portion stored in the data register.

4. The method according to claim 3, wherein the first node has a pair of branches associated therewith, and the executing the native machine code corresponds to navigating one branch of the branch pair by executing one of the shift opcodes in response to one outcome of the execution of the first bit-test opcode, and navigating another branch of the branch pair by executing a second bit-test opcode corresponding to a second one of the nodes in response to another outcome of the execution of the first bit-test opcode.

5. The method according to claim 3, wherein one of the leaf nodes is associated with the decoded data, and the executing the native machine code comprises executing one of the return opcodes in response to one outcome of the execution of the first bit-test opcode, the return opcode returning the decoded data upon execution thereof.

6. A computing device comprising:
   a data receiver configured for receiving data encoded with a set of prefix codes; and
   a processing unit coupled to the data receiver, the processing unit being configured to dynamically write native machine code for execution by the processing unit in response to receiving the encoded data at the data receiver, the native machine code representing a binary prefix code tree corresponding to the prefix code set, the machine code including branch opcodes that each correspond to one of a plurality of internal nodes of the binary prefix code tree, shift opcodes that each correspond to an outcome of one of the branch opcodes, and return opcodes that each correspond to one of a plurality of leaf nodes of the binary prefix code tree, and the native machine code excluding memory access opcodes and loop opcodes, the processing unit being further configured to decode the encoded data by executing the native machine code.

7. The computing device according to claim 6, further comprising a main memory coupled to the processing unit, and the processing unit is configured to execute the native machine code and access the encoded data stored in the main memory without accessing a constructed representation of the prefix code tree.

8. The computing device according to claim 6, wherein the processing unit comprises a data register storing a portion of the encoded data, at least one of the branch opcodes comprises a first bit-test opcode corresponding to a first one of the nodes, and the processing unit is configured by the native machine code to execute the first bit-test opcode in association with the data portion stored in the data register.

9. The computing device according to claim 8, wherein the first node has a pair of branches associated therewith, and the processing unit is configured by the native machine code to execute one of the shift opcodes, corresponding to navigating one branch of the branch pair, in response to one outcome of the execution of the first bit-test opcode, and to execute a second bit-test opcode corresponding to a second one of the nodes, corresponding to navigating another branch of the branch pair, in response to another outcome of the execution of the first bit-test opcode.

10. The computing device according to claim 8, wherein one of the leaf nodes is associated with decoded data, and the processing unit is configured by the native machine code to execute one of the return opcodes in response to one outcome of the execution of the first bit-test opcode, when executed the return opcode directing the processing unit to return the decoded data.

11. A computer readable, non-transitory storage medium storing processing instructions for a handheld communications device, the processing instructions, when executed by a processing unit of the handheld communications device, enabling the handheld communications device to implement a method comprising the following steps:
  receive a data stream encoded with a set of prefix codes;
  in response to receiving the encoded data at the handheld communications device, write native machine code for execution by the processing unit, the native machine code representing a binary prefix code tree corresponding to the prefix code set, the native machine code including branch opcodes that each correspond to one of a plurality of internal nodes of the binary prefix code tree, shift opcodes that each correspond to an outcome of one of the branch opcodes, and return opcodes that each correspond to one of a plurality of leaf nodes of the binary prefix code tree, and the native machine code excluding memory access opcodes and loop opcodes; and
  decode the data stream by executing the native machine code by the processing unit.

12. The method according to claim 1, wherein the native machine code further includes at least one of register load opcodes and return opcodes.

13. The method according to claim 1, wherein the data receiving comprises receiving the encoded data with the set of prefix codes.

14. The method according to claim 1, wherein the computing device is a handheld computing device.

15. The method according to claim 1, wherein the encoded data comprises compressed image data.

16. The computing device according to claim 6, wherein the native machine code further includes register load opcodes.

17. The computing device according to claim 6, wherein the data receiver is configured to receive the encoded data with the set of prefix codes.

18. The computing device according to claim 6, wherein the computing device comprises a handheld computing device.

19. The computing device according to claim 6, wherein the encoded data comprises compressed image data.

* * * * *